Nov. 7, 1967     T. A. ST. CLAIR     3,350,939
COMPENSATING INDEX DRIVE MEANS
Filed Oct. 15, 1965
*Fig. 1*
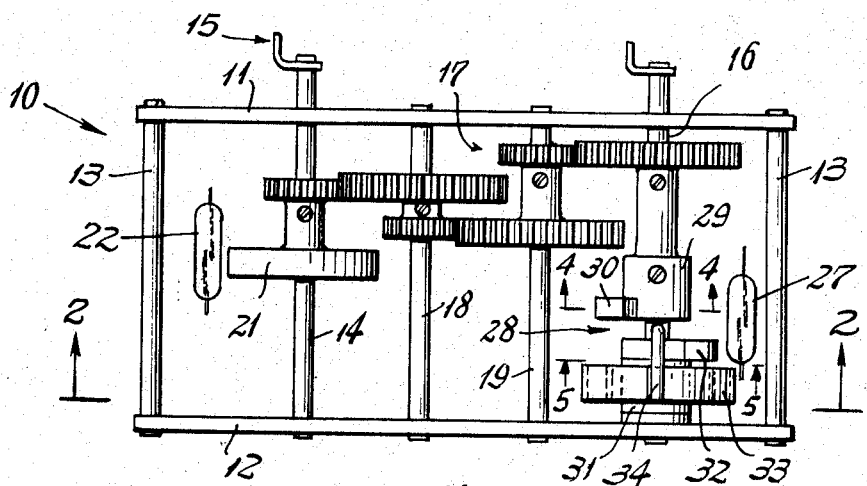
*Fig. 2*
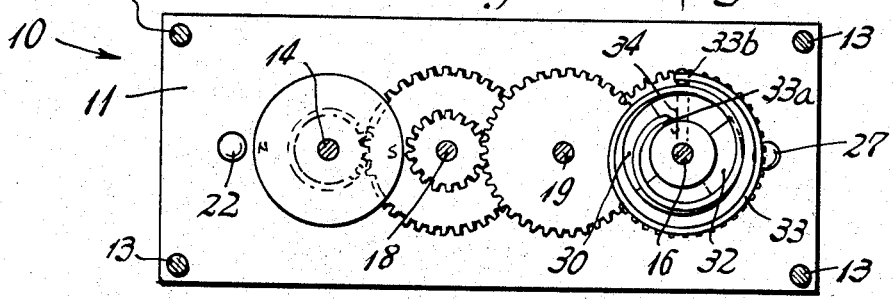
*Fig. 4*     *Fig. 5*
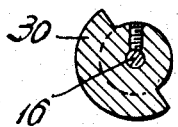 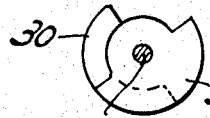
*Fig. 3*
*Fig. 6*
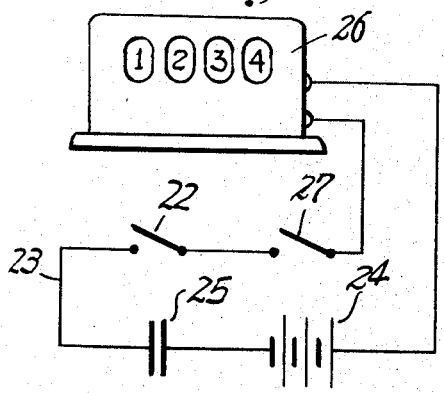 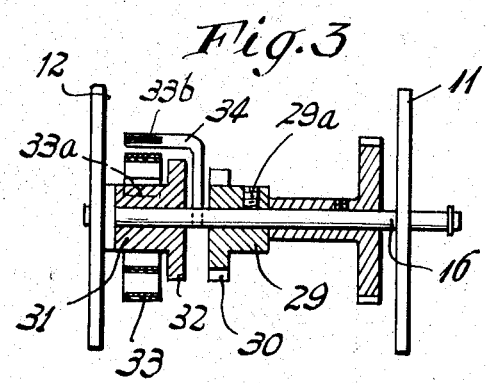
INVENTOR.
Theodore A. St. Clair
BY
Johnson and Kline
ATTORNEYS

United States Patent Office 3,350,939
Patented Nov. 7, 1967

3,350,939
COMPENSATING INDEX DRIVE MEANS
Theodore A. St. Clair, Fairfield, Conn., assignor to Textron Inc., Providence, R.I., a corporation of Rhode Island
Filed Oct. 15, 1965, Ser. No. 496,332
5 Claims. (Cl. 73—272)

ABSTRACT OF THE DISCLOSURE

The index device has magnetically operated means for producing a pulse in accordance with each rotation of the input shaft driven by the gas meter and has an output shaft driven at a lower speed than the input shaft and actuating control means including means responsive to a condition in the meter, such as temperature, for varying the number of pulses transmitted to a pulse counting index.

---

Currently index meter correctors for temperature or pressure variation in the meter have been in use but these have been expensive with some employing variable skip tooth gear configurations which require precision manufacture and assembly with attendant maintenance problems.

It is an object of the present invention to provide a compensating index drive means which is simple and effective in its operation and requires very little servicing.

This is accomplished by having a pulse generating means driven by the meter to supply pulses to actuate a pulse counting index and having a means for controlling the transmission of said pulses to said index in accordance with changes in conditions in the meter to compensate for variations from therein from a normal condition.

Other features and advantages of the invention will be apparent from the specification and claims when considered in connection with the accompanying drawings in which:

FIGURE 1 shows a plan view of the compensating drive unit.

FIG. 2 is a sectional view taken along line 2—2 of FIG. 1.

FIG. 3 is a sectional view taken along line 3—3 of FIG. 2.

FIGS. 4 and 5 are sectional views taken along lines 4—4 and 5—5 of FIG. 1.

FIG. 6 shows a diagrammatic circuit arrangement of the control switches and index.

In the operation of meters, and particularly gas meters, the meter index is driven by the meter device and can be affected by changes in pressure in the gas or changes in temperature of the gas or both so that the index will not give an accurate reading. The present invention provides a simple arrangement for correcting for these variables in the meter. In the illustrated form of the invention the correction is to take care of the variations in temperature in a gas meter.

As shown in FIG. 1, the index drive mechanism per se is shown which mechanism is mounted on the meter, preferably within a gas meter (not shown), to be responsive to changes in the meter. The index drive unit 10 comprises a pair of end plates 11, 12 held in spaced relation by the corner posts 13. The end plates rotatably mount a plurality of transversely extending shafts. Shaft 14 is the input shaft and has an end projecting from the plate 11 and provided with a driving dog 15 which is driven by the gas meter mechanism (not shown). Shaft 16 is an output shaft and is connected to the input shaft by reduction gearing 17 carried by idler shafts 18, 19 so that the input shaft rotates a predetermined number of revolutions for each revolution of the output shaft. In the illustrated form of the invention the gearing is so related that there are 60 revolutions of the input shaft for one revolution of the output shaft.

The invention comprises the production of a predetermined number of pulses for each rotation of the input shaft and has a means actuated by the output shaft for transmitting a variable number of pulses to a pulse counting index mechanism which number of pulses being passed is controlled by the temperature in the gas meter. While this may be done by mechanical means as by a cam operating a microswitch or a valve means in an electrical or fluid or hydraulic circuit, in the illustrated form of the invention it is done magnetically by securing on the input shaft a circular disk 21 for rotation therewith. The disk is magnetically polarized and located adjacent the disk is a switch 22, preferably a sealed magnetically operated normally open reed switch, connected in an electrical circuit 23 having a source of energy, such as battery 24, and a condenser 25. For each revolution of the input shaft the polarized magnetic disk 21 will close and open the switch 22 so as to produce a pulse in the electrical circuit 23 for transmission to a pulse counting index device 26 connected in said circuit. Also included in the circuit is a second sealed magnetically operated normally open reed switch 27 which is located so as to be actuated by a magnetic operator means 28 rotatably carried by the output shaft. This operator means has a construction providing a variable gap in the operator means which can be adjusted to have an extent of between 0°–180° according to variations in conditions in the meter and comprises a first hub 29 secured as by set screw 29a to the shaft 16 for rotation therewith and having a semicircular magnet 30 projecting therefrom and a second hub 31 provided with a semicircular magnet 32 which is mounted on the shaft 16 adjacent the first hub to have relative rotation with respect to the shaft and is connected to the shaft to be driven thereby by a bimetallic thermally responsive spiral 33 having one end 33a secured to the hub and the other end 33b secured to a post 34 secured to the shaft to rotate therewith. While the magnets 30, 32 are both rotated with the shaft, the magnet 32 is rotated relatively to the magnet 30 in accordance with the variations in the bimetal spiral to adjust the gap and together constitute a single magnetic operator for the switch 27.

Normally, the semicircular magnets are so related that there is a predetermined peripheral gap, which peripheral gap is enlarged or reduced by the rotation of magnet 32 with respect to magnet 30 by the bimetal spiral 33 in accordance with the temperature variations and thus operate the switch 27 for the greater or shorter part of the revolution of shaft 16. If the temperature increases or decreases from said normal temperature it will cause the relatively movable magnet to move in one direction or the other to increase or decrease its gap, and with the gap so altered it alters the period of closure of the pulse transmitting switch 27 so that more or less of the pulses generated by switch 22 will be transmitted to the pulse counting index which will therefore be accurately controlled by the pulses and temperature compensation is had.

Thus it will be seen that a very accurate compensation can be had. Furthermore, by proper design of the bimetal, the number of pulses may be made a linear function of the absolute minimum temperature and the index can be corrected for such variations in the meter temperature.

While the foregoing example is given for correcting for temperature only, it is to be understood that by utilizing a closed pressure responsive bellows in lieu of the temperature correcting bimetal spiral, with the bellows providing the required adjustment of the two magnets to produce the gap in the operator means 28, the index can be similarly compensated for pressure variations in the meter. Further, by the use of the bellows in combination with the thermostat in the meter, the compensation for both variations can be achieved.

Variations and modifications may be made within the scope of the claims and portions of the improvements may be used without others.

I claim:

1. An index drive means for a meter or the like comprising an input shaft driven by said meter and having means cooperating therewith to produce a predetermined number of pulses per rotation of said input shaft, an output shaft connected to said input shaft to be rotated thereby at a predetermined relative lower speed, and control means actuated by said output shaft for transmitting said pulses to a pulse counting index means, said control means including means responsive to a condition in said meter for varying the number of pulses transmitted in accordance with the variations in said conditions in the meter.

2. An index drive means for a gas meter or the like comprising an input shaft driven by said meter, a circuit connected to a pulse counting index means, said shaft having means cooperating with the circuit to produce a predetermined number of pulses therein per rotation of said input shaft, an output shaft connected to said input shaft to be rotated thereby at a predetermined lower relative speed, control means in said circuit and actuated by said output shaft for controlling the transmission of said pulses to said pulse counting index means, and temperature responsive means operating said control means for varying the number of pulses transmitted in accordance with the temperature of the gas meter.

3. An index drive means for a meter or the like comprising an input shaft driven by said meter, an electrical circuit having a first switch means therein, means actuated by said shaft to operate said switch means to produce one pulse per rotation of said input shaft, an output shaft connected to said input shaft to be rotated thereby at a predetermined lower relative speed, a second switch means in said circuit, and control means actuated by said output shaft for controlling the operation of said second switch means and the transmission of said pulses thereby to a pulse counting index means, said control means including temperature responsive means for varying the operation of said second switch means in accordance with the temperature of the meter.

4. An index drive means for a gas meter or the like comprising an input shaft driven by said meter, an electrical circuit connected to a pulse counting index means and including a first enclosed magnetically operated switch, said input shaft having a magnet thereon to actuate said switch once for each revolution of the shaft to produce one pulse per revolution of said input shaft, an output shaft connected to said input shaft to be rotated so as to make one revolution for a plurality of revolutions of said input shaft, a second enclosed magnetic switch in said circuit, and control means actuated by said output shaft for operating said second switch for controlling the transmission of said pulse to said pulse counting index means, said control means including a first semicircular magnet connected to rotate with said output shaft and a second semicircular magnet rotatably connected to said shaft by a tempertaure responsive means to rotate therewith, said two magnets being angularly displaced and cooperating to form a magnetic operator having a variable gap therein controlled by said temperature responsive means for varying the operation of said second switch means and the number of pulses transmitted thereby in accordance with the temperature of the gas meter.

5. An index drive means for a gas meter or the like comprising an input shaft driven by said meter, an electrical circuit having a first sealed switch means therein, means actuated by said shaft to operate said switch means to produce one pulse per rotation of said input shaft, an output shaft connected to said input shaft to be rotated thereby at a predetermined lower relative speed with respect to said input shaft, a second sealed switch means in said circuit, control means actuated by said output shaft for controlling the operation of said second switch means and the transmission of said pulses thereby to a pulse counting index means, said control means including means forming a variable gap for varying the operation of said second switch means and means responsive to a variable condition in the meter for varying said gap in accordance with said variable condition in the gas meter.

References Cited

UNITED STATES PATENTS

| | | | |
|---|---|---|---|
| 1,611,833 | 12/1926 | Hahn et al. | |
| 2,243,475 | 5/1941 | Dallmann et al. | 73—233 |
| 2,974,525 | 3/1961 | Cole | 73—231 |
| 3,075,383 | 1/1963 | Favill et al. | 73—231 |
| 3,176,514 | 4/1965 | Foster | 73—229 |

RICHARD C. QUEISSER, *Primary Examiner.*

JAMES J. GILL, *Examiner.*

E. GILHOOLY, *Assistant Examiner.*